(12) United States Patent
Yoshino

(10) Patent No.: US 7,248,030 B2
(45) Date of Patent: Jul. 24, 2007

(54) CIRCUIT AND METHOD FOR CONTROLLING STEP-UP/STEP-DOWN DC-DC CONVERTER

(75) Inventor: Takahiro Yoshino, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 11/196,258

(22) Filed: Aug. 4, 2005

(65) Prior Publication Data

US 2006/0238182 A1 Oct. 26, 2006

(30) Foreign Application Priority Data

Apr. 21, 2005 (JP) .............................. 2005-123798

(51) Int. Cl.
*G05F 1/56* (2006.01)
(52) U.S. Cl. ...................... 323/284; 323/222; 323/225; 323/271
(58) Field of Classification Search ................ 323/222, 323/225, 271, 282, 284, 288
See application file for complete search history.

(56) References Cited

U.S. PATENT DOCUMENTS

| | | | | |
|---|---|---|---|---|
| 5,933,331 A * | 8/1999 | Boldin et al. | ................. | 363/16 |
| 6,812,676 B2 * | 11/2004 | Tateishi | ...................... | 323/225 |
| 6,813,173 B2 * | 11/2004 | Lipcsei | ......................... | 363/98 |
| 6,958,595 B2 * | 10/2005 | Niiyama et al. | ............. | 323/282 |
| 6,977,488 B1 * | 12/2005 | Nogawa et al. | ............. | 323/271 |
| 7,002,817 B2 * | 2/2006 | Lipcsei | ......................... | 363/98 |
| 7,116,085 B2 * | 10/2006 | Ikezawa | ..................... | 323/225 |
| 7,135,843 B2 * | 11/2006 | Ikezawa | ..................... | 323/282 |
| 7,176,667 B2 * | 2/2007 | Chen et al. | ................. | 323/282 |

\* cited by examiner

*Primary Examiner*—Jeffrey Sterrett
(74) *Attorney, Agent, or Firm*—Arent Fox LLP.

(57) ABSTRACT

A step-up/step-down DC-DC converter for reducing loss caused by activation and inactivation of transistors. An error amplifier included in a control circuit generates an error signal in accordance with voltage difference between an output voltage and a reference voltage. A PWM comparator compares a triangular wave signal and the error signal to generate a control pulse signal having a pulse width that is in accordance with the voltage difference between the output voltage and the reference voltage. A pulse detector monitors the control pulse signal and generates a mode switch signal for switching the operation mode of the DC-DC converter in accordance with a monitoring state of the control pulse signal. A switch provides the PWM comparator with the triangular wave signal or an offset signal, which is generated by adding an offset voltage to the triangular wave signal, in response to the mode switch signal.

20 Claims, 11 Drawing Sheets

CIRCUIT AND METHOD FOR CONTROLLING STEP-UP/STEP-DOWN DC-DC CONVERTER

CROSS-REFERENCE TO RELATED APPLICATIONS

This application is based upon and claims the benefit of priority from the prior Japanese Patent Application No. 2005-123798, filed on Apr. 21, 2005, the entire contents of which are incorporated herein by reference.

BACKGROUND OF THE INVENTION

The present invention relates to a DC-DC converter, and more particularly, to a circuit and method for controlling a step-up/step-down DC-DC converter.

Portable electronic devices, such as notebook computers and game machines, incorporate a plurality of semiconductor integrated circuit devices. Each semiconductor integrated circuit device included in an electronic device is supplied with operating power from a battery. The output voltage of a battery decreases as the battery is discharged. Electronic devices use a DC-DC converter to keep the operating power voltage constant. Three types of DC-DC converters are known, namely, a step-down DC-DC converter, a step-up DC-DC converter, and a step-up/step-down DC-DC converter. The type of DC-DC converter used by an electronic device is determined in accordance with conditions such as consumption power, operation time during use of the battery, size of the electronic device, and weight of the electronic device.

FIG. 1 is a schematic block circuit diagram of a step-up/step-down DC-DC converter 10 according to a first prior art example.

The DC-DC converter 10 performs DC-DC conversion on an input voltage Vi to generate an output voltage Vo.

The DC-DC converter 10 includes a control circuit 11, a choke coil L1, output transistors T1, T2, T3, and T4, and a smoothing capacitor C1. Each of the transistors T1 to T4 is an N-channel metal oxide semiconductor (MOS) transistor.

The first transistor T1 has a drain supplied with the input voltage Vi and a source connected to a first terminal (input side terminal) of the choke coil L1. The second transistor T2, which is used for synchronous rectification and which corresponds to the first transistor T1, has a drain connected to the first terminal (input side terminal) of the choke coil L1 and has a source connected to a low-potential power supply (ground).

The third transistor T3 has a drain connected to a second terminal (output side terminal) of the choke coil L1, and has a source connected to the low-potential power supply (ground). The fourth transistor T4, which is used for synchronous rectification and which corresponds to the third transistor T3, has a drain connected to the smoothing capacitor C1 and a source connected to the second terminal (output side terminal) of the choke coil L1.

The gates of the first transistor T1 and the third transistor T3 at the main switching side are provided with a first control signal DH from the control circuit 11. The gates of the second transistor T2 and the fourth transistor T4 at the synchronous side are provided with a second control signal DL from the control circuit 11. The first transistor T1 and the third transistor T3 are turned on and off at the same time. The second transistor T2 and the fourth transistor T4 are turned on and off at the same time.

When the first transistor T1 and the third transistor T3 are turned on and the second transistor T2 and the fourth transistor T4 are turned off, current flows through the choke coil L1 so that energy is accumulated in the choke coil L1. Then, when the first transistor T1 and the third transistor T3 are turned off and the second transistor T2 and the fourth transistor T4 are turned on, the energy accumulated in the choke coil L1 is discharged via the second transistor T2. The on-time of the first transistor T1 is the time during which current flows through the choke coil L1. Energy is accumulated in the choke coil L1 in accordance with the on-time of the first transistor T1. The value of the output voltage Vo is determined by the energy accumulated in the choke coil L1, which is in accordance with the on-time of the first transistor T1 and the second transistor T2. The smoothing capacitor C1 smoothes the output voltage Vo.

A feedback signal FB having the output voltage Vo is fed back to the control circuit 11. An error amplifier 12 included in the control circuit 11 amplifies the voltage difference between a divided voltage, which is obtained by dividing the feedback signal FB using resistors R1 and R2, and the voltage of a reference power supply e1 to generate an amplified signal. A pulse width modulation (PWM) comparator 13 compares the amplified signal of the error amplifier 12 and a triangular wave signal of a triangular wave oscillator 14 to generate the control signal DH, which has a pulse width that is in accordance with the comparison result, and a control signal DL, which is complementary to the signal DH.

When the energy accumulated in the choke coil L1 decreases, the output voltage Vo decreases, and the divided voltage obtained using the resistors R1 and R2 becomes lower than the voltage of the reference power supply e1, the first transistor T1 and the third transistor T3 are turned on. Then, when the output voltage Vo increases, the output voltage of the error amplifier 12 decreases, the on-time of the first transistor T1 and the third transistor T3 is shortened, and the on-time of the second transistor T2 and the fourth transistor T4 is lengthened. When the output voltage Vo decreases, the output voltage of the error amplifier 12 increases, the on-time of the first transistor T1 and the third transistor T3 is lengthened, and the on-time of the second transistor T2 and the fourth transistor T4 is shortened. Such operation keeps the output voltage Vo maintained as a constant voltage based on the reference power supply e1.

In the DC-DC converter 10, the first transistor T1 and the third transistor T3 are turned on and off at the same time, and the second transistor T2 and the fourth transistor T4 are turned on and off at the same time. In other words, a large number of transistors operate at the same time. This results in operation loss and lowers efficiency of the DC-DC converter 10.

FIG. 2 is a schematic block circuit diagram of a DC-DC converter 20 according to a second prior art example. A control circuit 21 of the DC-DC converter 20 controls first and second step-down transistors T1 and T2 separately from third and fourth step-up transistors T3 and T4. More specifically, the control circuit 21 includes a first PWM comparator 22 and a second PWM comparator 23. The first PWM comparator 22 generates control signals for controlling the step-down first and second transistors T1 and T2. The second PWM comparator 23 generates control signals for controlling the step-up third and fourth transistors T3 and T4. A voltage supply e2 is connected between an inversion input terminal of the second PWM comparator 23 and a triangular wave oscillator 14. A triangular wave signal of the triangular wave oscillator 14 is offset by an amount corresponding to a DC voltage of the voltage supply e2. The second PWM comparator 23 is provided with the offset triangular wave signal.

The first PWM comparator 22 compares the triangular wave signal of the triangular wave oscillator 14 and an amplified signal of the error amplifier 12 to generate the control signals DH1 and DL1 based on the comparison result. The second PWM comparator 23 compares the triangular wave signal of the triangular wave oscillator 14 to which the voltage of the voltage supply e2 is added and the amplified signal of the error amplifier 12 to generate the control signals DH2 and DL2 based on the comparison result. Thus, the control circuit 21 operates the step-up transistors T3 and T4 or the step-down transistors T1 and T2 in accordance with the level of the output voltage Vo. In this way, the DC-DC converter 20 operates as a step-up DC-DC converter or a step-down DC-DC converter depending on the level of the output voltage Vo. Although the DC-DC converter 20 includes the four transistors T1 to T4, operation loss that would be caused when activating and inactivating two transistors at a time is avoided.

SUMMARY OF THE INVENTION

In the DC-DC converter 20 shown in FIG. 2, the step-up operation and the step-down operation may be performed at the same time, that is, the step-up/step-down operation may be performed, using an offset voltage (DC voltage added to the output signal of the triangular wave oscillator 14 by the voltage supply e2). More specifically, when the offset voltage is smaller than a peak-to-peak value of the triangular wave signal of the triangular wave oscillator 14, the first PWM comparator 22 and the second PWM comparator 23 output the control signals DH1 and DL1 and the control signals DH2 and DL2, which have pulse waveforms, at the same time. In this case, the four transistors T1 to T4 of the DC-DC converter 20 shown in FIG. 2 are turned on and off at the same time. Thus, the DC-DC converter 20 fails to sufficiently reduce operation loss.

The present invention provides a circuit and method for controlling a step-up/step-down DC-DC converter that reduces operation loss caused by on and off operations of transistors.

One aspect of the present invention is a step-up/step-down DC-DC converter for generating an output voltage from an input voltage. The step-up/step-down DC-DC converter includes a choke coil. A pair of step-down transistors and a pair of step-up transistors are connected to the choke coil. A control circuit controls the pair of step-down transistors and the pair of step-up transistors based on the output voltage of the DC-DC converter. The control circuit includes an error amplifier for comparing the output voltage with a reference voltage and generating an error signal that is in accordance with voltage difference between the output voltage and the reference voltage. A pulse width modulation comparator, connected to the error amplifier, compares the error signal with a triangular wave signal and generates a control pulse signal having a pulse width that is in accordance with the voltage difference between the output voltage and the reference voltage. A pulse detector, connected to the pulse width modulation comparator, receives the control pulse signal and generates a mode switch signal for switching an operation mode of the DC-DC converter in accordance with the state of the control pulse signal. An offset voltage adding unit, connected to the pulse detector, adds an offset voltage to the triangular wave signal or to the error signal in response to the mode switch signal.

A further aspect of the present invention is a control circuit for a step-up/step-down DC-DC converter including a choke coil, a pair of step-down transistors connected to the choke coil, and a pair of step-up transistors connected to the choke coil. The control circuit controls the pair of step-down transistors and the pair of step-up transistors based on an output voltage of the DC-DC converter. The control circuit includes an error amplifier for comparing the output voltage with a reference voltage and generating an error signal that is in accordance with voltage difference between the output voltage and the reference voltage. A pulse width modulation comparator, connected to the error amplifier, compares the error signal with a triangular wave signal and generates a control pulse signal having a pulse width that is in accordance with the voltage difference between the output voltage and the reference voltage. A pulse detector, connected to the pulse width modulation comparator, receives the control pulse signal and generates a mode switch signal for switching an operation mode of the DC-DC converter in accordance with the state of the control pulse signal. An offset voltage adding unit, connected to the pulse detector, adds an offset voltage to the triangular wave signal or the error signal in response to the mode switch signal.

Another aspect of the present invention is a method for controlling a step-up/step-down DC-DC converter including a choke coil, a pair of step-down transistors connected to the choke coil, and a pair of step-up transistors connected to the choke coil. The method includes comparing an output voltage of the DC/DC converter with a reference voltage and generating an error signal that is in accordance with voltage difference between the output voltage and the reference voltage, comparing the error signal with a triangular wave signal and generating a control pulse signal having a pulse width that is in accordance with the voltage difference between the output voltage and the reference voltage, controlling the pair of step-down transistors and the pair of step-up transistors based on the control pulse signal, generating a mode switch signal for switching an operation mode of the DC-DC converter in accordance with the state of the control pulse signal, and adding an offset voltage to the triangular wave signal or the error signal in accordance with the mode switch signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
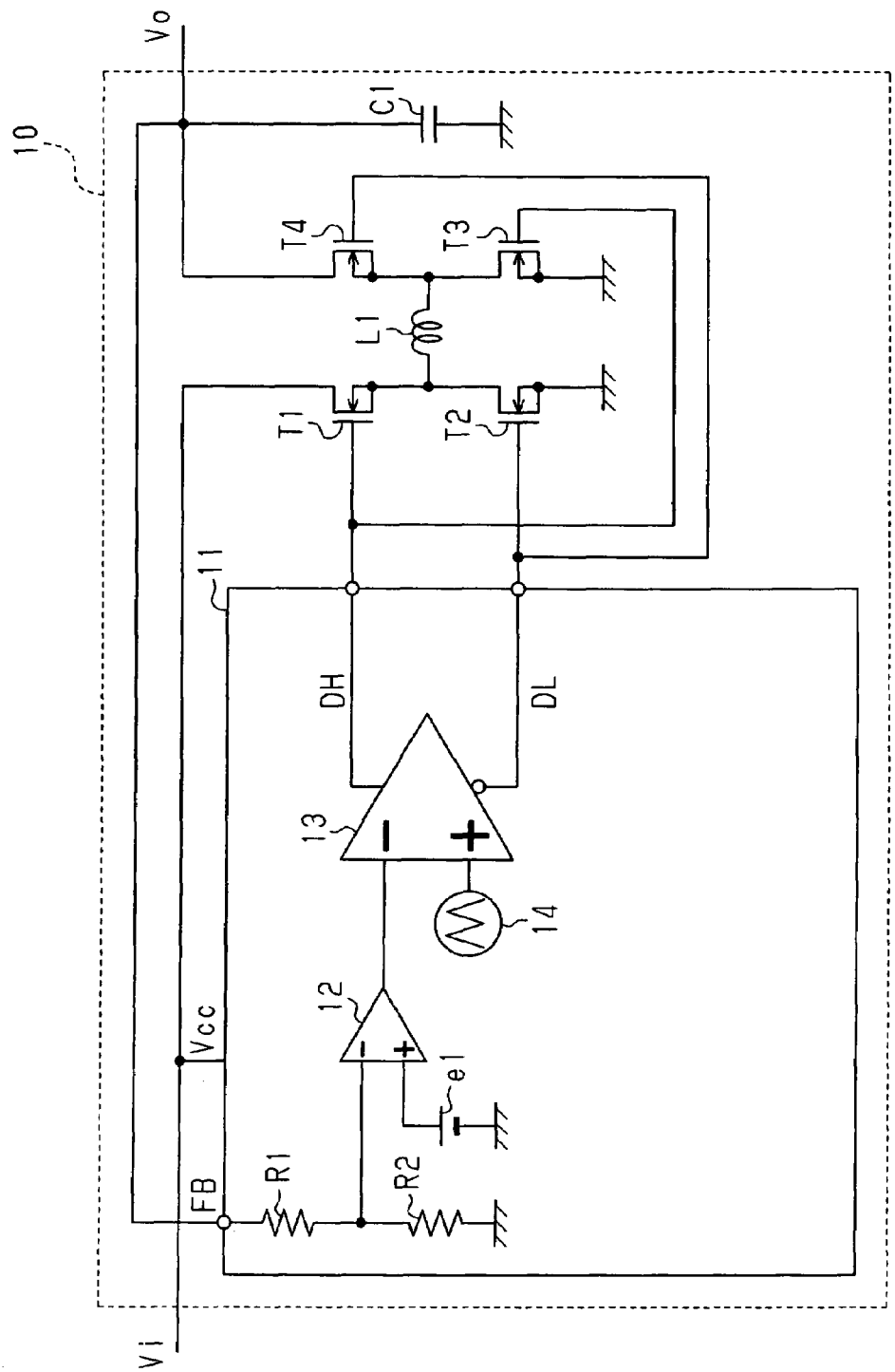
FIG. 1 is a schematic block circuit diagram of a step-up/step-down DC-DC converter according to a first prior art example.
Figure 2:
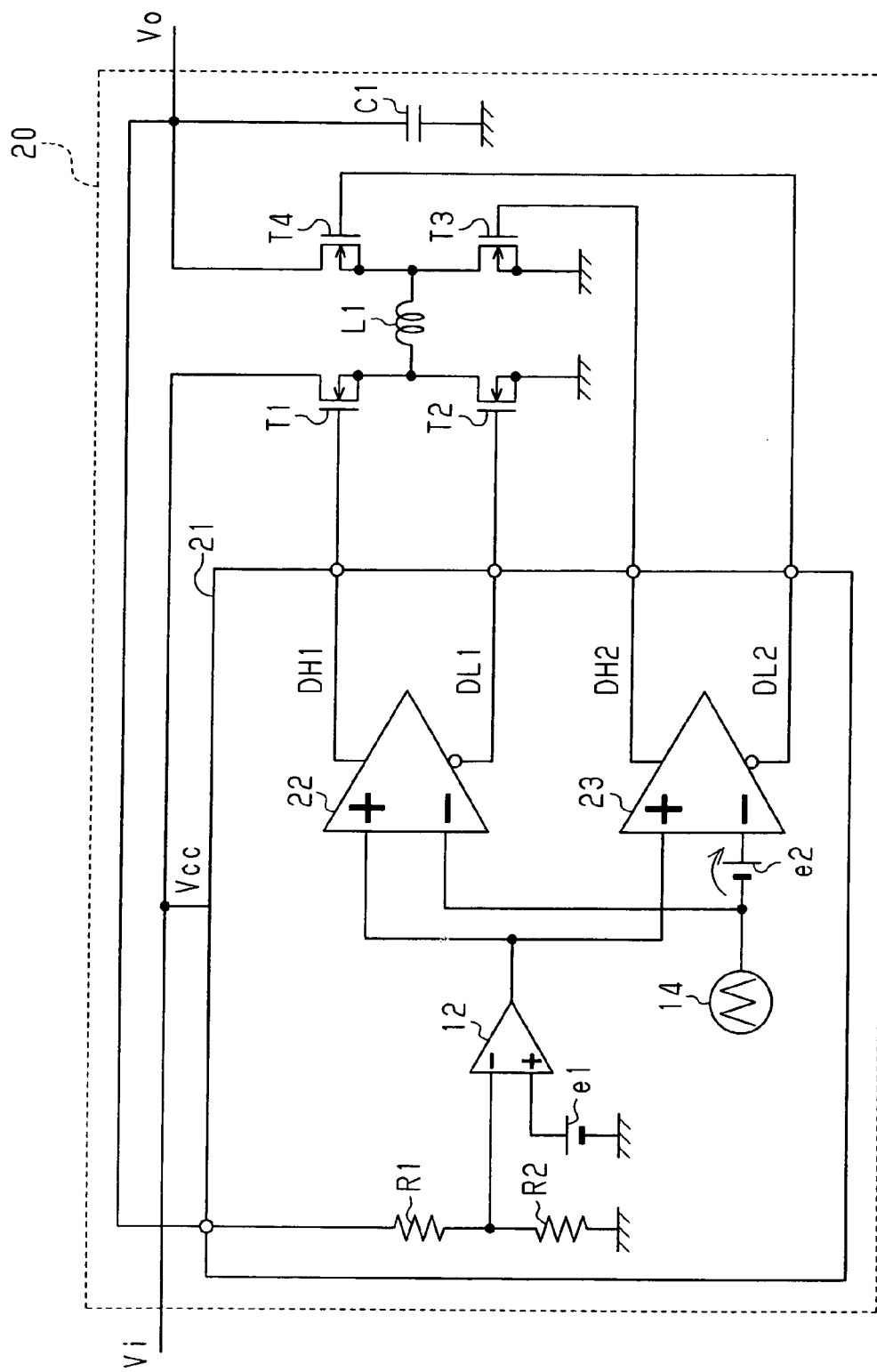
FIG. 2 is a schematic block circuit diagram of a step-up/step-down DC-DC converter according to a second prior art example.

A DC-DC converter 30 according to a preferred embodiment of the present invention will now be described with reference to FIGS. 3 to 8.

The DC-DC converter 30 includes a control circuit 31, output transistors T1 to T4, a choke coil L1, and a smoothing capacitor C1. Each of the transistors T1 to T4 is preferably an N-channel MOS transistor.

The control circuit 31 provides the gate of each of the transistors T1 to T4 with a control signal. More specifically, the control circuit 31 provides the gate of the first transistor T1 with a control signal DH1, and the gate of the second transistor T2 with a control signal DL1. Further, the control circuit 31 provides the gate of the third transistor T3 with a control signal DH2, and the gate of the fourth transistor T4 with a control signal DL2.

The first transistor T1 has a drain supplied with input voltage Vi and has a source connected to a first terminal (input side terminal) of the choke coil L1. The second transistor T2, which is used for synchronous rectification and which corresponds to the first transistor T1, has a drain connected to the first terminal of the choke coil L1 and a source connected to ground.

The third transistor T3 has a drain connected to a second terminal (output side terminal) of the choke coil L1, and a source connected to a low-potential power supply (ground). The fourth transistor T4, which is used for synchronous rectification and which corresponds to the third transistor T3, has a drain connected to the smoothing capacitor C1 and a source connected to the second terminal of the choke coil L1. Further, the drain of the fourth transistor T4 is connected to the control circuit 31. A feedback signal FB having the potential at the drain (node) of the fourth transistor T4 is provided to the control circuit 31.

The control circuit 31 is supplied with the input voltage Vi as a driving power supply Vcc. The control circuit 31 generates the control signals DH1, DL1, DH2, and DL2, which are provided to the gates of the transistors T1 to T4, based on the feedback signal FB. Each of the transistors T1 to T4 is turned on and off in response to the corresponding one of the control signals DH1 to DL2. Energy is accumulated in the choke coil L1 in accordance with the activation and inactivation of each of the transistors T1 to T4. An output voltage Vo having a level that is in accordance with the accumulated energy is generated.

The control circuit 31 includes an error amplifier 32, a PWM comparator 33, an oscillator 34, a pulse detector 35, selection circuits 36 and 37, resistors R1 and R2, a reference power supply e1, a voltage supply e2, and a switch SW.

The feedback signal FB is provided to a first terminal of the resistor R1. A second terminal of the resistor R1 is connected to a first terminal of the second resistor R2. A second terminal of the second resistor R2 is connected to ground. A node between the first resistor R1 and the second resistor R2 is connected to the error amplifier 32. The first and second resistors R1 and R2 form a voltage dividing circuit, which generates a divided voltage Vf by dividing the feedback signal FB according to a resistance ratio of the first and second resistors R1 and R2.

The error amplifier 32 has an inversion input terminal, to which the divided voltage Vf generated by dividing the feedback signal FB is input, and a non-inversion input terminal, to which a reference voltage V1 is input from the reference power supply e1. The reference voltage V1 is set to coincide with the divided voltage Vf, which is generated by the resistors R1 and R2, when the output voltage Vo reaches a specified value. The error amplifier 32 amplifies the voltage difference between the divided voltage Vf and the reference voltage V1 to generate an error signal S1 having the amplified potential.

The PWM comparator 33 has a non-inversion input terminal, which receives the error signal S1, and an inversion input terminal, which is connected to the switch SW and to the voltage supply e2. The switch SW has a common contact, a first contact, and a second contact. The connection of the common contact is switched between the first contact and the second contact. The common contact is connected to the oscillator 34. The first contact is connected to the inversion input terminal of the PWM comparator 33. The second contact is connected to a positive terminal of the voltage supply e2. A negative terminal of the voltage supply e2 is connected to the inversion input terminal of the PWM comparator 33.

The oscillator 34 generates a triangular wave signal S2, which has a constant frequency, and a monitor pulse signal S3. The monitor pulse signal S3 has the same cycle as the triangular wave signal S2 and maintains a predetermined level (e.g., a high (H) level) for a fixed period of time. When the common contact and the first contact of the switch SW are connected, the triangular wave signal S2 of the oscillator 34 is provided to the PWM comparator 33.

The negative terminal of the voltage supply e2 is provided with the triangular wave signal S2 from the oscillator 34. The voltage supply e2 adds a DC voltage V2 to the triangular wave signal S2 to generate an offset signal S4. The offset signal S4 has the same waveform as the triangular wave signal S2 and has the potential difference between the triangular wave signal S2 and the DC voltage V2.

The inversion input terminal of the PWM comparator 33 is provided with the triangular wave signal S2 from the oscillator 34 or the offset signal S4 generated when the voltage supply e2 adds the DC voltage V2 to the triangular wave signal S2. The PWM comparator 33 compares the error signal S1 with the triangular wave signal S2 or the offset signal S4. The PWM comparator 33 generates a control pulse signal S5 having a high (H) level when the voltage of the error signal S1 is higher than the voltage of the triangular wave signal S2 or the offset signal S4. The PWM comparator 33 generates the control pulse signal S5 at a low (L) level when the voltage of the error signal S1 is lower than the voltage of the triangular wave signal S2 or the offset signal S4. The triangular wave signal S2 has a triangular waveform with a predetermined frequency. Thus, the control pulse signal S5 has a pulse width that is in accordance with the level of the error signal S1. The voltage of the error signal S1 corresponds to the difference between the divided voltage Vf of the output voltage Vo and the reference voltage V1. Thus, the control pulse signal S5 has a pulse width that is in accordance with the voltage difference between the output voltage Vo and the reference voltage V1.

The pulse detector 35 is provided with the control pulse signal S5 of the PWM comparator 33 and the monitor pulse signal S3 of the oscillator 34. The pulse detector 35 monitors the control pulse signal S5 and generates a mode switch signal S6 for switching between a step-up operation mode and a step-down operation mode based on the monitoring results. The pulse detector 35 determines whether the operation mode of the DC-DC converter 30 needs to be switched in every switching cycle of the DC-DC converter 30 that is based on the cycles of the monitor pulse signal S3. The pulse detector 35 generates the mode switch signal S6 based on the determination results. In detail, the pulse detector 35 monitors the level and the duty of the control pulse signal S5 in every switching cycle. When the control pulse signal S5 is at an H level and the duty of the control pulse signal S5 is 100%, the pulse detector 35 generates the mode switch signal S6, for example, at an H level to change the operation mode to the step-up operation mode. When the control pulse signal S5 is at an L level and the duty ratio of the control pulse signal S5 is 100%, the pulse detector 35 generates mode the switch signal S6 at an L level to change the operation mode to the step-down operation mode.

In response to the H level mode switch signal S6, the switch SW connects the common contact to the second contact to enter the step-up operation mode and provides the offset signal S4 to the inversion input terminal of the PWM comparator 33. In response to the L level mode switch signal S6, the switch SW connects the common contact to the first contact to enter the step-down operation mode and provides the triangular wave signal S2 to the inversion input terminal of the PWM comparator 33.

Each of the first selection circuit 36 and the second selection circuit 37 is provided with the control pulse signal S5 and the mode switch signal S6 of the pulse detector 35. The first selection circuit 36 is connected to the gate of the first transistor T1 and the gate of the second transistor T2. The second selection circuit 37 is connected to the gate of the third transistor T3 and the gate of the fourth transistor T4.

The first selection circuit 36 generates the control signal DH1, which is provided to the gate of the first transistor T1, and the control signal DL1, which is provided to the gate of the second transistor T2, in accordance with the operation mode based on the control pulse signal S5 and the mode switch signal S6. In detail, the first selection circuit 36 generates the control signals DH1 and DL1, which are substantially complementary to each other and have pulse waveforms based on the control pulse signal S5 in accordance with the mode switch signal S6 indicating the step-down operation mode. The first selection circuit 36 generates the control signal DH1 at an H level and the control signal DL1 at an L level in accordance with the mode switch signal S6 indicating the step-up operation mode.

The second selection circuit 37 generates the control signal DH2, which is provided to the gate of the third transistor T3, and the control signal DL2, which is provided to the gate of the fourth transistor T4, in accordance with the operation mode based on the control pulse signal S5 and the mode switch signal S6. In detail, the second selection circuit 37 generates the control signal DH2 at an L level and the control signal DL2 at an H level in accordance with the mode switch signal S6 indicating the step-down operation mode. The second selection circuit 37 generates the control signals DH2 and DL2 that are substantially complementary to each other and have pulse waveforms based on the control pulse signal S5 in accordance with the mode switch signal S6 indicating the step-up operation mode.

In the step-up operation mode, the first transistor T1 remains continuously on, and the second transistor T2 remains continuously off. The third transistor T3 and the fourth transistor T4 are turned on and off in a complementary manner in response to the control signals DL2 and DH2. Thus, the DC-DC converter 30 operates as a step-up DC-DC converter that activates and inactivates the third transistor T3 and the fourth transistor T4, which are connected to the output side of the choke coil L1, to generate the output voltage Vo by raising the input voltage Vi.

In the step-down operation mode, the third transistor T3 remains continuously off, and the fourth transistor T4 remains continuously on. The first transistor T1 and the second transistor T2 are turned on and off in a complementary manner in response to the control signals DH1 and DL1. Thus, the DC-DC converter 30 operates as a step-down DC-DC converter that activates and inactivates the first transistor T1 and the second transistor T2, which are connected to the input side of the choke coil L1, to generate the output voltage Vo, which is obtained by lowering the input voltage Vi.

Figure 4:
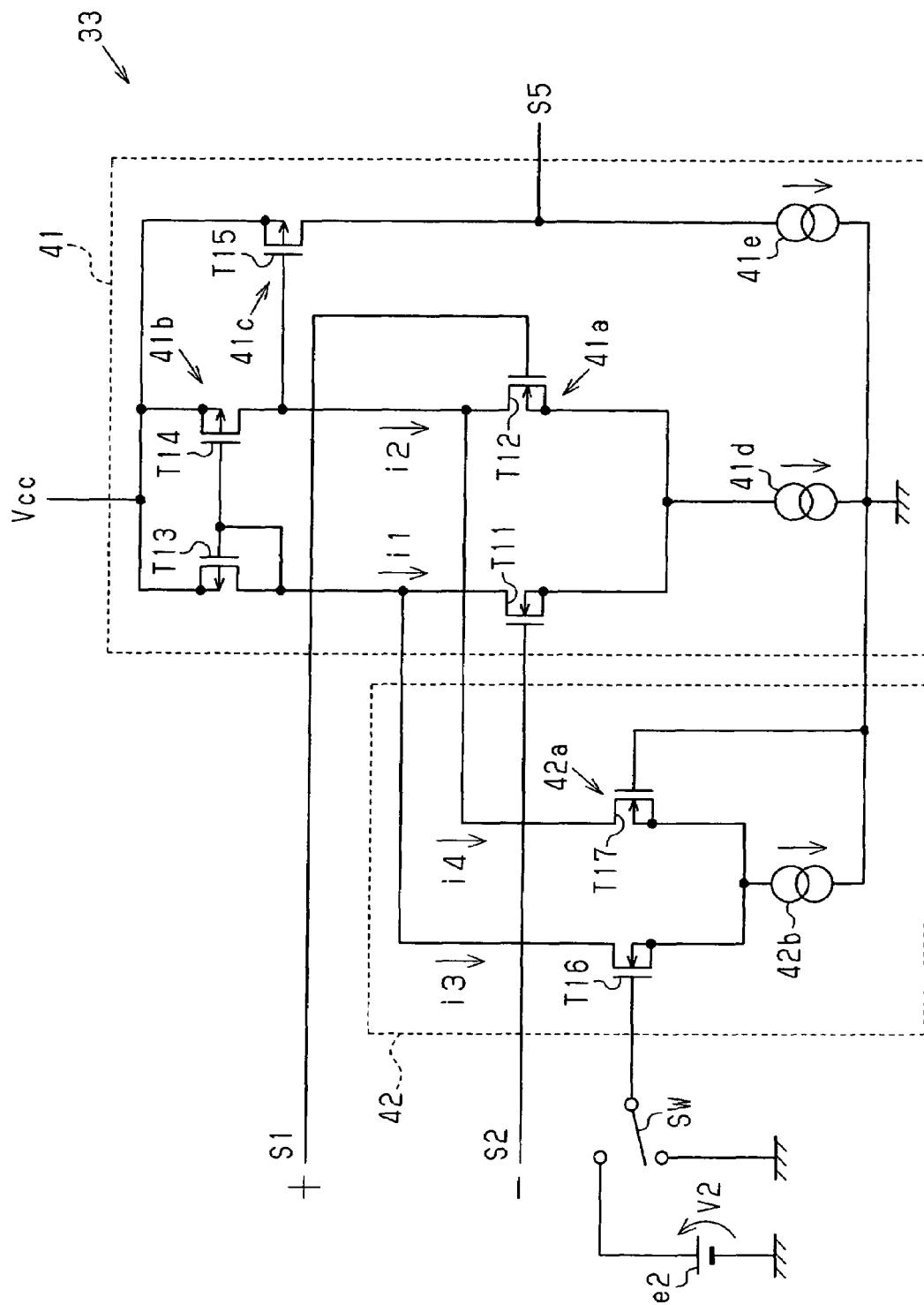
FIG. 4 is a schematic circuit diagram of a PWM comparator included in the step-up/step-down DC-DC converter of FIG. 3.

FIG. 4 is a circuit diagram of the PWM comparator 33. The PWM comparator 33 includes an operation amplification circuit 41 (voltage comparison circuit) and an offset adjustment circuit 42.

The operation amplification circuit 41 includes a first differential input unit 41a, a current mirror unit 41b, and an output unit 41c. The differential input unit 41a is configured by two transistors T11 and T12. Each of the transistors T11 and T12 is an N-channel MOS transistor. The sources of the transistors T11 and T12 are connected to each other. A node between the transistors T11 and T12 is connected to a low-potential power supply (ground in the preferred embodiment) via a constant current supply 41d. The gate of the first transistor T11 is connected to the inversion input terminal. The gate of the second transistor T12 is connected to the non-inversion input terminal. The drains of the transistors T11 and T12 are connected to the current mirror unit 41b.

The current mirror unit 41b is configured by two transistors T13 and T14. Each of the transistors T13 and T14 is a P-channel MOS transistor. The drain of the transistor T13 is connected to the drain of the transistor T11. The drain of the transistor T14 is connected to the drain of the transistor T12. The sources of the transistors T13 and T14 are connected to a driving power supply Vcc. The gates of the transistors T13 and T14 are connected to each other and are to the drain of the transistor T13.

The output unit 41c is configured by a transistor T15. A node between the fourth transistor T14 and the second transistor T12 is connected to the gate of the transistor T15. The transistor T15 is a P-channel MOS transistor. The transistor T15 has a source connected to the driving power supply Vcc and has a drain connected to the low-potential power supply via a constant current supply 41e.

The offset adjustment circuit 42 includes a second differential input unit 42a and a constant current supply 42b. The second differential input unit 42a is connected in parallel with the differential input unit 41a of the operation amplification circuit 41. The constant current supply 42b is connected in parallel to the constant current supply 41d of the operation amplification circuit 41. The second differential input unit 42a is configured by two transistors T16 and T17. Each of the transistors T16 and T17 is an N-channel MOS transistor. The sources of the transistors T16 and T17 are connected to each other. A node between the transistors T16 and T17 is connected to the low-potential power supply via the constant current supply 42b. The gate of the seventh transistor T17 is connected to the low-potential power supply. The drains of the transistors T16 and T17 are connected to the current mirror unit 41b. The drain of the transistor T16 is connected to the drain of the transistor T13. The drain of the transistor T17 is connected to the drain of the transistor T14.

Figure 3:
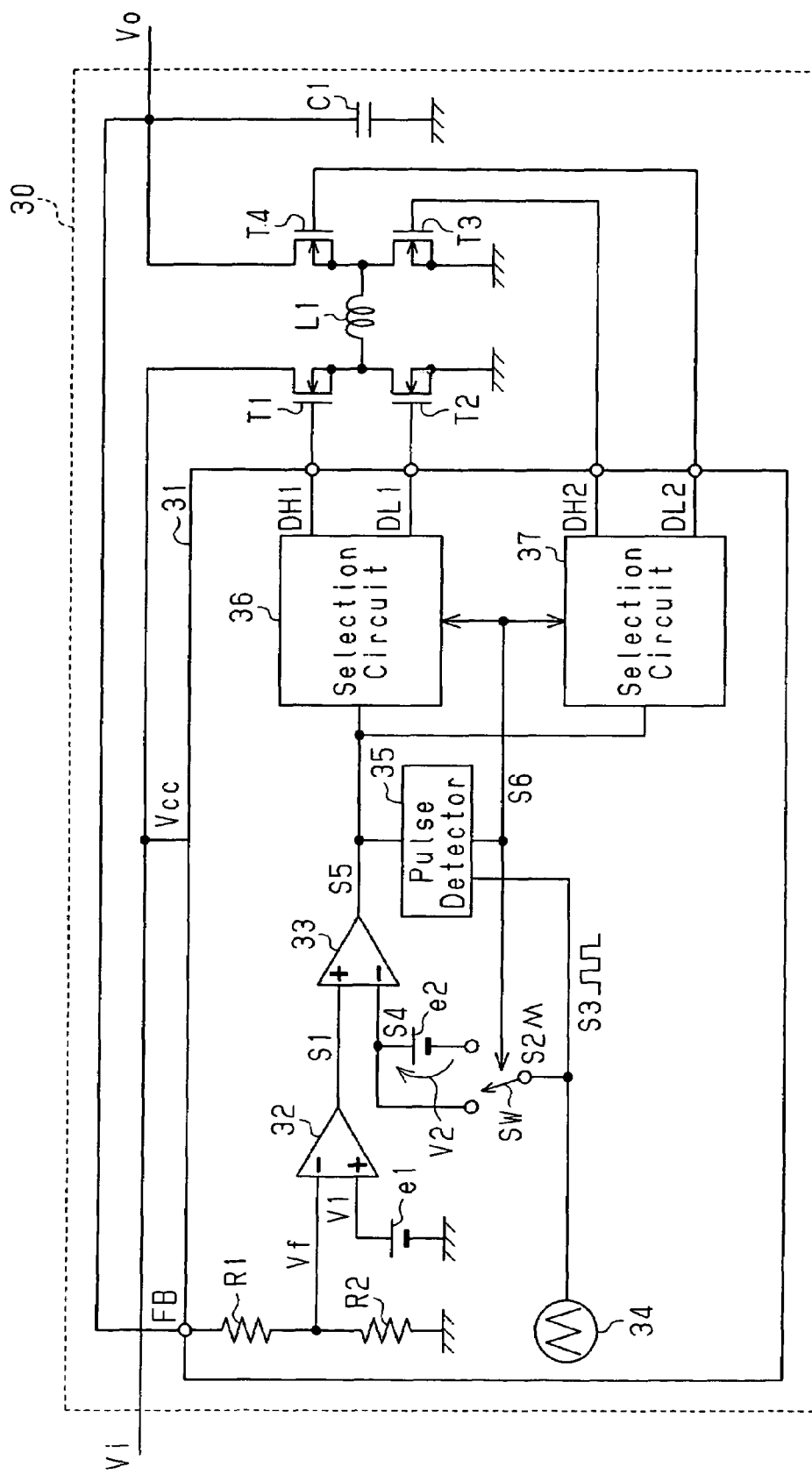
FIG. 3 is a schematic block circuit diagram of a step-up/step-down DC-DC converter according to a preferred embodiment of the present invention.

FIG. 4 further shows in detail the connections of the PWM comparator 33 to the switch SW and the voltage supply e2. The connections shown in FIG. 4 differ from the connections of the PWM comparator 33 to the switch SW and the voltage supply e2 shown in FIG. 3. This is because FIG. 3 shows in principle the state in which the offset voltage V2 is added to the triangular wave signal S2 of the oscillator 34 by the voltage supply e2.

The gate of the first transistor T11 is connected to the inversion input terminal. The gate of the second transistor T12 is connected to the non-inversion input terminal. The gate of the first transistor T11 is provided with the triangular wave signal S2 of the oscillator 34. The gate of the second transistor T12 is provided with the error signal S1.

The gate of the sixth transistor T16 is connected to the common contact of the switch SW. The switch SW has a first terminal connected to a low-potential power supply and a second terminal connected to a positive terminal of the voltage supply e2. A negative terminal of the voltage supply e2 is connected to a low-potential power supply.

When the gate of the sixth transistor T16 is connected to the low-potential power supply via the switch SW, current does not flow through the transistors T16 and T17 (i3=i4=0) because the gate of the seventh transistor T17 is connected to the low-potential power supply. Current i1, which is in accordance with the triangular wave signal S2, flows through the first transistor T11. Current i4, which is in accordance with the error signal S1, flows through the second transistor T2. Thus, the PWM comparator 33 generates a control pulse signal S5 at an H level or at an L level in accordance with the voltage difference between the triangular wave signal S2, which is provided to the gate of the first transistor T11, and the error signal S1, which is provided to the gate of the second transistor T12.

When the gate of the sixth transistor T16 is connected to the voltage supply e2 via the switch SW, current i3, which is in accordance with the offset voltage V2 of the voltage supply e2, flows through the sixth transistor T16. The current i1 that is in accordance with the triangular wave signal S2 flows through the first transistor T11. Current i4, which is in accordance with the error signal S1, flows through the second transistor T2. Thus, synthesized current (i1+i3) of the current i1 flowing through the first transistor T11 and the current i3 flowing through the sixth transistor T16 flows through the third transistor T13. Thus, the PWM comparator 33 generates a control pulse signal S5 at an H level or at an L level in accordance with the voltage difference between the voltage obtained by adding the voltage of the triangular wave signal S2, which is provided to the gate of the first transistor T11, to the offset voltage V2 of the voltage supply e2, and the voltage of the error signal S1, which is provided to the gate of the second transistor T12.

Figure 5:
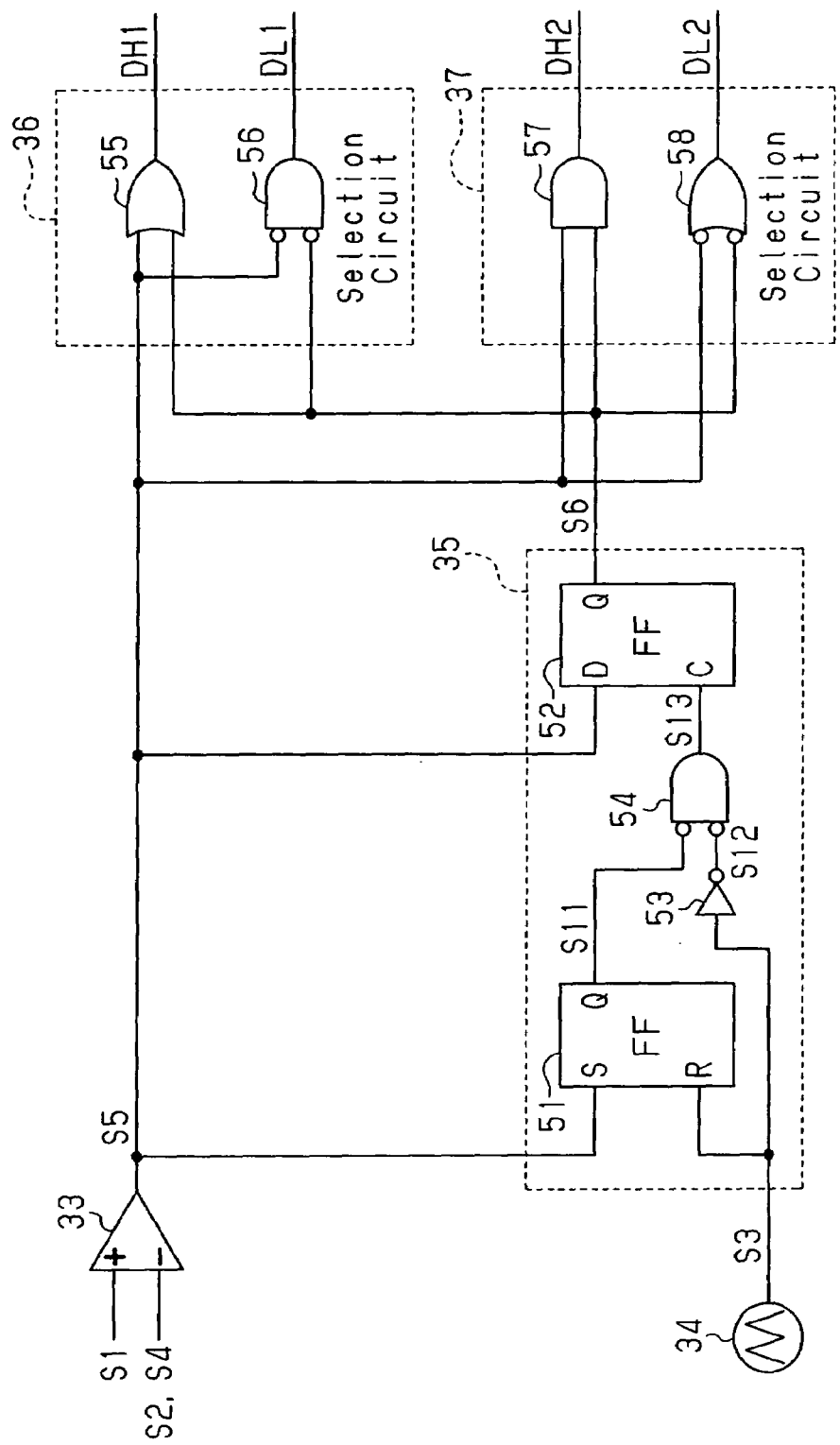
FIG. 5 is a schematic circuit diagram of a pulse detector and selection circuits included in the step-up/step-down DC-DC converter of FIG. 3.

FIG. 5 is a schematic circuit diagram of the pulse detector 35 and the selection circuits 36 and 37.

The pulse detector 35 includes flop-flop circuits (FF circuits) 51 and 52, an inverter circuit 53, and a logic circuit 54. The first FF circuit 51 is an RS flip-flop circuit and has a set terminal S for receiving the control pulse signal S5 and a reset terminal R for receiving the monitor pulse signal S3 of the oscillator 34. The first FF circuit 51 has an output terminal Q connected to the logic circuit 54.

The monitor pulse signal S3 has a pulse width that is sufficient for resetting the first FF circuit 51. The first FF circuit 51 generates, at its output terminal Q, a signal S11 having an H level when the control pulse signal S5 has an H level, and a signal S11 having an L level when the monitor pulse signal S3 has an H level.

The inverter circuit 53 is provided with the monitor pulse signal S3. The output terminal of the inverter circuit 53 is connected to the logic circuit 54. The output terminal of the logic circuit 54 is connected to the second FF circuit 52. The logic circuit 54 generates a signal S13 having an H level when the output signal S11 of the first FF circuit 51 and the output signal S12 of the inverter circuit 53 are both at an L level, and generates the signal S13 at an L level when at least one of the two signals S11 and S12 is at an H level. The second FF circuit 52, which is a D flip-flop circuit, has an input terminal D for receiving the control pulse signal S5 and an input terminal C for receiving the output signal S13 of the logic circuit 54. The second FF circuit 52 generates the mode switch signal S6 at its output terminal Q.

The first selection circuit 36 includes first and second logic circuits 55 and 56. Each of the first and second logic circuits 55 and 56 is provided with the control pulse signal S5 and the mode switch signal S6. The first logic circuit 55 generates the control signal DH1 at an H level when at least one of the control pulse signal S5 and the mode switch signal S6 is at an H level, and generates the control signal DH1 at an L level when the control pulse signal S5 and the mode switch signal S6 are both at an L level. The second logic circuit 56 generates the control signal DL1 at an H level when the control pulse signal S5 and the mode switch signal S6 are both at an L level, and generates the control signal DL1 at an L level when at least one of the control pulse signal S5 and the mode switch signal S6 is at an H level. Thus, the first selection circuit 36 generates the control signal DH1 at an H level and the control signal DL1 at an L level when the mode switch signal S6 is at an H level, and generates the control signal DH1, which has substantially the same level as the control pulse signal S5, and the control signal DL1, which is complementary to the control signal DH1, when the mode switch signal S6 is at an L level.

The second selection circuit 37 includes first and second logic circuits 57 and 58. Each of the first and second logic circuits 57 and 58 is provided with the control pulse signal S5 and the mode switch signal S6. The first logic circuit 57 generates the control signal DH2 at an H level when the control pulse signal S5 and the mode switch signal S6 are both at an H level, and generates the control signal DH2 at an L level when at least one of the control pulse signal S5 and the mode switch signal S6 is at an L level. The second logic circuit 58 generates the control signal DL2 at an H level when at least one of the control pulse signal S5 and the mode switch signal S6 is at an L level, and generates the control signal DL2 at an L level when the control pulse signal S5 and the mode switch signal S6 are both at an H level. Thus, the second selection circuit 37 generates the control signal DH2, which has substantially the same level as the control pulse signal S5, and the control signal DL2, which is complementary to the control signal DH2, when the mode switch signal S6 is at an H level, and generates the control signal DH2 at an L level and the control signal DL2 at an H level when the mode switch signal S6 is at an L level.

The operation of the DC-DC converter 30 will now be described with reference to FIGS. 6 to 8.

It is presumed here that the DC-DC converter 30 is operating in the step-down operation mode. Each cycle of the triangular wave signal S2 is set as a switching cycle of the DC-DC converter 30.

Figure 8:
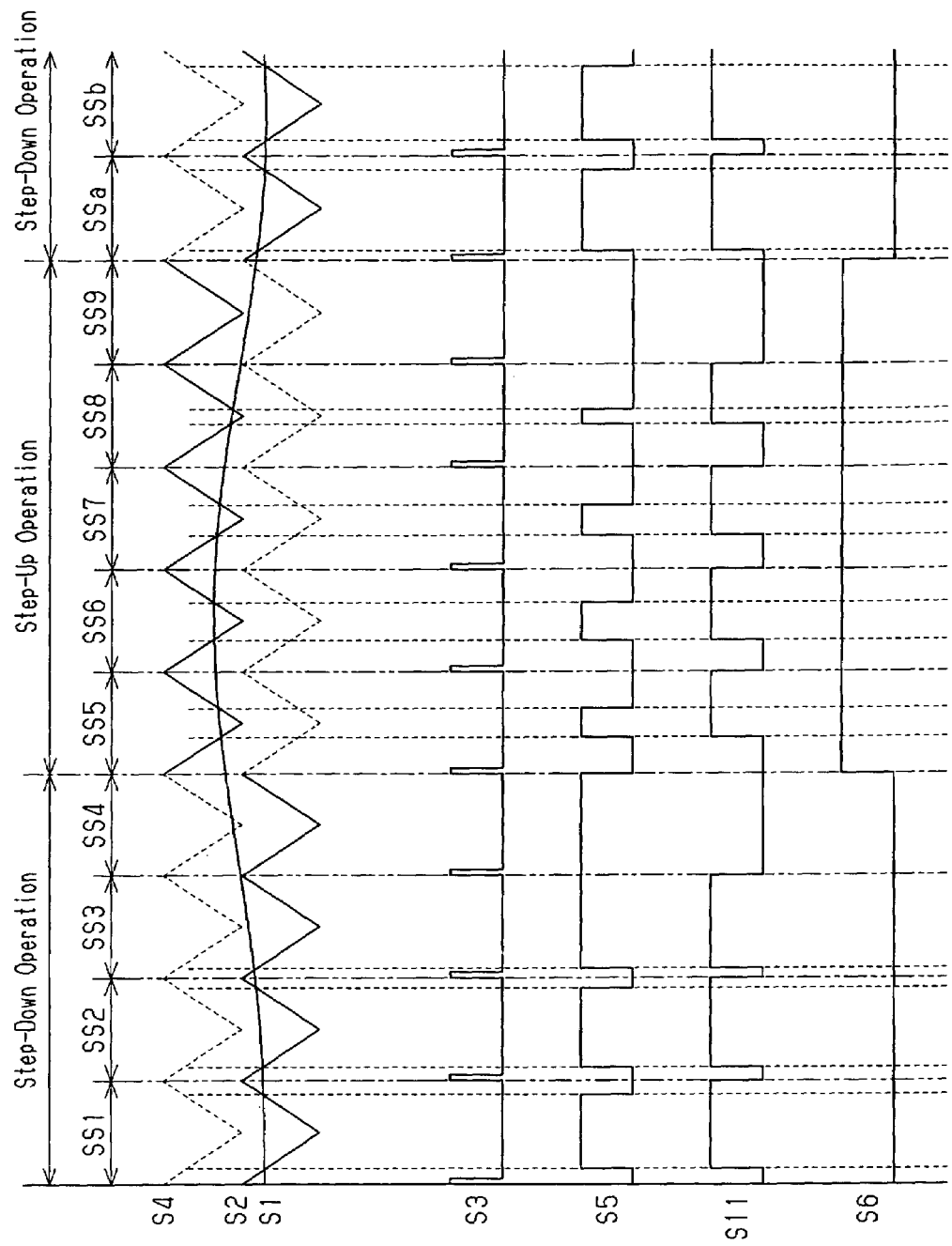
FIG. 8 is a waveform diagram showing the operation of the step-up/step-down DC-DC converter of FIG. 3.

The second FF circuit 52 of FIG. 5, or the pulse detector 35, outputs the mode switch signal S6 at an L level as shown in FIG. 8. The PWM comparator 33 of FIG. 3 compares the triangular wave signal S2 with the error signal S1, and generates the control pulse signal S5 with a pulse waveform that is in accordance with the comparison result as shown in FIG. 8. Thus, the PWM comparator 33 generates the control pulse signal S5 having a pulse waveform in switching cycles SS1 to SS3 as shown in FIG. 8 because the potential of the error signal S1 of the error amplifier 32 is between the minimum and maximum potentials of the triangular wave signal S2. Then, when the step-down operation causes the potential of the error signal S1 generated by the error amplifier 32 to be higher than the maximum potential of the triangular wave signal S2, the PWM comparator 33 generates the control pulse signal S5 at an H level in switching cycle SS4 shown in FIG. 8.

The first FF circuit 51 of FIG. 5 generates the signal S11 at an L level when the monitor pulse signal S3 provided from the oscillator 34 has an H level, and generates the signal S11 at an H level when the control pulse signal S5 provided from the PWM comparator 33 has an H level. Thus, the first FF circuit 51 maintains the signal S11 at an L level in switching cycle SS4 in which the PWM comparator 33 outputs the control pulse signal S5 at an H level. Accordingly, the second FF circuit 52 generates the mode switch signal S6 at an H level in the next switching cycle SS5 as shown in FIG. 8.

If the switch SW is switched to set the step-up operation mode in response to the H level mode switch signal S6, the inversion input terminal of the PWM comparator 33 is provided with the offset signal S4. The PWM comparator 33 compares the offset signal S4 with the error signal S1. In FIGS. 6 to 8, the solid line shows the signal when provided to the PWM comparator 33, that is, when compared with the error signal S1, and the broken line shows the signal when not compared with the error signal S1.

Figure 6:
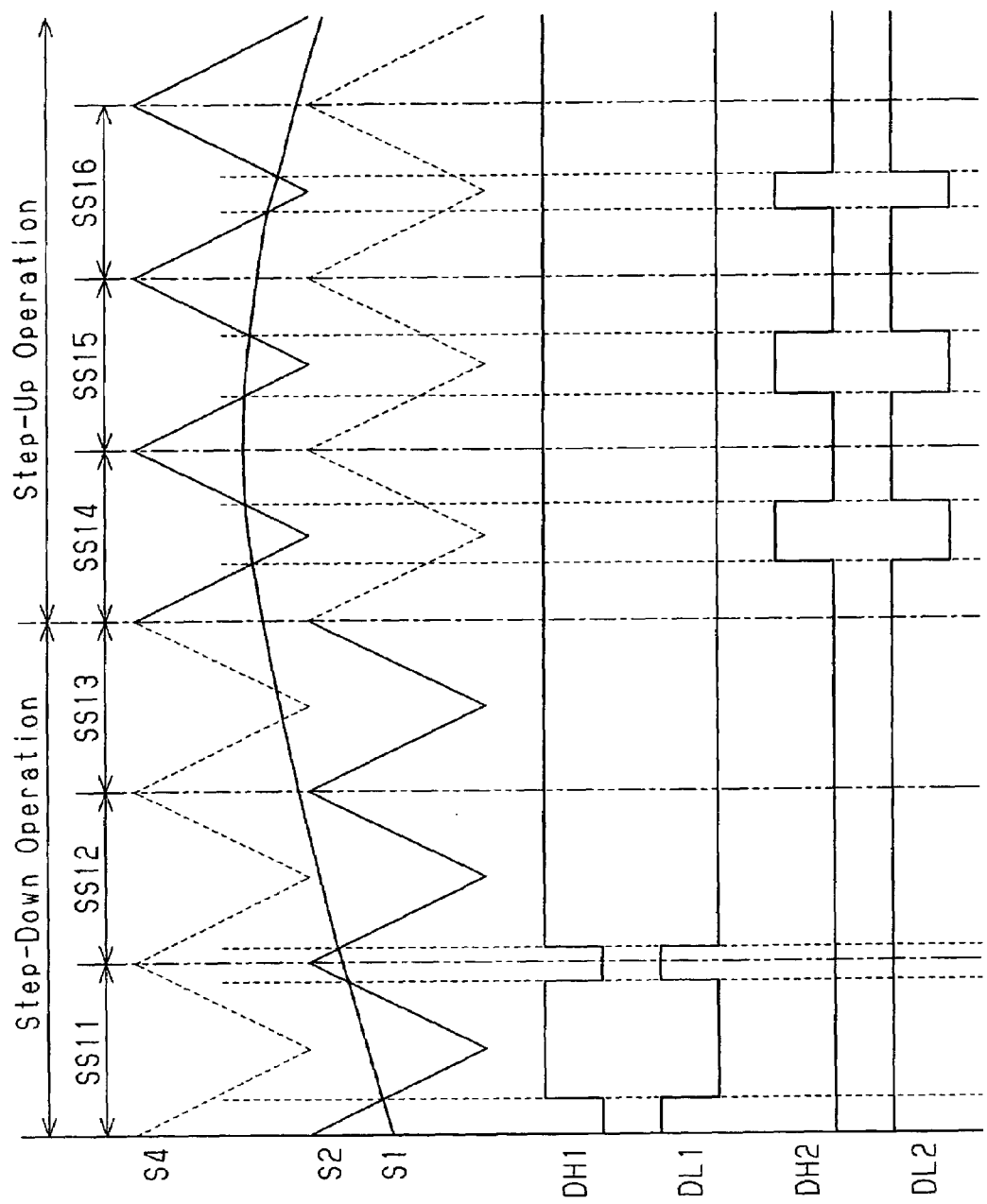
FIG. 6 is a waveform diagram showing the operation of the step-up/step-down DC-DC converter of FIG. 3.

In the step-down operation mode, the first selection circuit 36 of FIG. 3 generates the controls signals DH1 and DL1 in pulses in switching cycles SS11 and SS12 as shown in FIG. 6 based on the control pulse signal S5 and the mode switch signal S6. The second selection circuit 37 of FIG. 3 generates the control signal DH2 at an L level and the control signal DL2 at an H level. As a result, the third transistor T3 is continuously turned off, and the fourth transistor T4 is continuously turned on. The first transistor T1 and the second transistor T2 are turned on and off in a complementary manner in response to the control signals DH1 and DL1. Thus, the DC-DC converter 30 operates as a step-down DC-DC converter that activates and inactivates the first transistor T1 and the second transistor T2, which are connected to the input side of the choke coil L1.

When the DC-DC converter 30 performs the step-down operation, the error signal S1 rises in the manner shown in FIG. 6 as the output voltage Vo decreases. When the potential of the error signal S1 becomes higher than the maximum potential of the triangular wave signal S2 in switching cycle SS13, the first selection circuit 36 of the control circuit 31 generates the control signal DH1 at an H level and the control signal DL1 at an L level. Then, as shown in FIG. 8, when the mode switch signal S6 rises to an H level, the PWM comparator 33 in FIG. 3 compares the offset signal S4 with the error signal SI. Thus, as shown in FIG. 6, the first selection circuit 36 generates an H level control signal DH1 and an L level control signal DL1 based on the control pulse signal S5 and the mode switch signal S6. The second selection circuit 37 in FIG. 3 generates control signals DH2 and DL2 in pulses in switching cycles SS14 to SS16. As a result, the second transistor T2 is continuously turned off, and the first transistor T1 is continuously turned on. The third transistor T3 and the fourth transistor T4 are turned on and off in a complementary manner in response to the control signals DL2 and DH2. Thus, the DC-DC converter 30 operates as a step-up DC-DC converter that activates and inactivates the third transistor T3 and the fourth transistor T4, which are connected to the output side of the choke coil L1.

In the step-up operation mode, the second FF circuit 52 in FIG. 5, or the pulse detector 35, outputs the mode switch signal S6 at an H level as shown in FIG. 8. The PWM comparator 33 compares the offset signal S4 with the error signal S1, and generates a control pulse signal S5 having a pulse waveform that is in accordance with the comparison result as shown in FIG. 8. Thus, the PWM comparator 33 generates the control pulse signal S5 with a pulse waveform in switching cycles SS5 to SS8 as shown in FIG. 8 because the potential of the error signal S1 of the error amplifier 32 is between the minimum and maximum potentials of the offset signal S4. Then, when the step-up operation causes the potential of the error signal S1 generated by the error amplifier 32 to be lower than the minimum potential of the offset signal S4, the PWM comparator 33 generates the control pulse signal S5 at an L level in switching cycle SS9 as shown in FIG. 8.

The first FF circuit 51 of FIG. 5 generates the signal S11 at an L level when the monitor pulse signal S3 provided from the oscillator 34 has an H level, and generates the signal S11 at an H level when the control pulse signal S5 provided from the PWM comparator 33 has an H level. Thus, in switching cycle SS9 in which the PWM comparator 33 generates the control pulse signal S5 at an L level, the first FF circuit 51 holds the signal S11 at an L level. The second FF circuit 52 generates the mode switch signal S6 at an L level in the next switching cycle SSa as shown in FIG. 8. Then, the switch SW is switched to set the step-down operation mode in response to the L level mode switch signal S6, and the inversion input terminal of the PWM comparator 33 is provided with the triangular wave signal S2. As shown in FIG. 8, the PWM comparator 33 compares the triangular wave signal S2 with the error signal S1.

Figure 7:
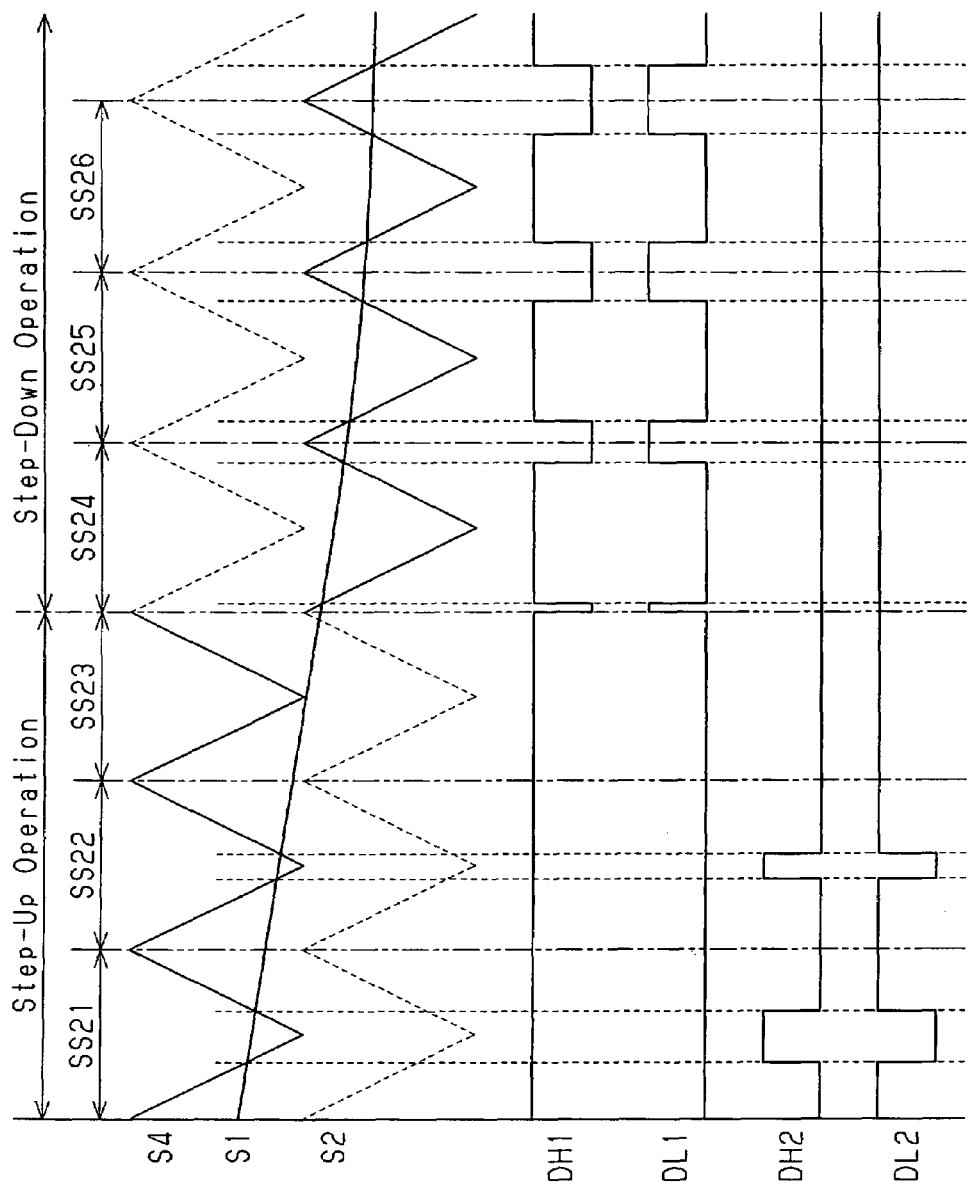
FIG. 7 is a waveform diagram showing the operation of the step-up/step-down DC-DC converter of FIG. 3.

In the step-up operation mode, the DC-DC converter 30 operates as a step-up DC-DC converter that activates and inactivates the third transistor T3 and the fourth transistor T4 based on the pulsed control signals DH2 and DL2, which are provided from the second selection circuit 37, in switching cycles SS21 and SS22 as shown in FIG. 7. When the potential of the error signal S1 becomes lower than the minimum potential of the triangular wave signal S2 in switching cycle SS23, the pulse detector 35 generates the switch signal S6 at an L level mode to set the step-down operation mode as shown in FIG. 8. Thus, the PWM comparator 33 compares the triangular wave signal S2 with the error signal S1. As shown in FIG. 7, the first selection circuit 36 generates control signals DH1 and DL1 in pulses, and the second selection circuit 37 generates the control signal DH2 at an L level and the control signal DL2 at an H level based on the control pulse signal S5 and the mode switch signal S6. As a result, the DC-DC converter 30 operates as a step-down DC-DC converter that activates and inactivates the first transistor T1 and the second transistor T2, which are connected to the output side of the choke coil L1.

The DC-DC converter 30 of the preferred embodiment has the advantages described below.

(1) The control circuit 31 includes the error amplifier 32, the PWM comparator 33, and the pulse detector 35. The control circuit 31 further includes the voltage supply e2 and the switch SW for changing the offset voltage added to the triangular wave signal. The error amplifier 32 generates the error signal S1 in accordance with the voltage difference between the output voltage Vo and the reference voltage V1. The PWM comparator 33 compares the triangular wave signal S2 with the error signal S1, and generates a control pulse signal S5 having a pulse width that is based on the voltage difference between the output voltage Vo and the reference voltage V1 in accordance with the comparison result. The pulse detector 35 monitors the control pulse signal S5 to generate the mode switch signal S6, which switches the operation mode, in accordance with the monitoring result. The switch SW is switched in response to the mode switch signal S6 so that the triangular wave signal S2 or the offset signal S4 obtained by adding the offset voltage V2 to the triangular wave signal S2 is provided to the PWM comparator 33. In other words, the offset voltage added to the triangular wave signal S2 is changed between 0V and the voltage V2. In this way, the step-down transistors T1 and T2 or the step-up transistors T3 and T4 are controlled in accordance with the operation mode. This reduces operation loss that would be caused by the activation and inactivation of the four transistors. Further, in the step-down operation mode and the step-up operation mode, the single PWM comparator 33 generates the control signals DH1 and DL1 for controlling the step-down transistors T1 and T2, and the control signals DH2 and DL2 for controlling the step-up transistors T3 and T4. This prevents the circuit scale of the DC-DC converter 30 from being enlarged.

(2) The control circuit 31 includes the oscillator 34 and the selection circuits. The oscillator 34 generates the triangular wave signal S2. The selection circuits select pairs of step-down transistors or pairs of step-up transistors based on the mode switch signal, and provide the selected transistor pair with a control signal generated based on the control pulse signal S5. Accordingly, the operation loss caused by transistors operating in the present operation mode is reduced by controlling the pair of step-down transistors or the pair of step-up transistors selected in accordance with the operation mode.

(3) The control circuit 31 includes the oscillator 34, which generates the monitor pulse signal S3 having a pulse waveform in predetermined cycles. The pulse detector 35 determines whether the operation mode is to be switched in each switching cycle based on the monitor pulse signal S3, and generates the mode switch signal based on the determination result. This ensures the switching of the operation mode in accordance with each switching cycle. Further, the pair of step-down transistors or the pair of step-up transistors is controlled in a single switching cycle. This reduces the operation loss caused by the transistors operating in the present operation mode.

(4) The pulse detector 35 determines that the operation mode needs to be switched when the duty of the control pulse signal is 100%. This ensures the detection of the potential of the error signal S1 exceeding a potential range of the triangular wave signal S2 when the operation mode is switched.

It should be apparent to those skilled in the art that the present invention may be embodied in many other specific forms without departing from the spirit or scope of the invention. Particularly, it should be understood that the present invention may be embodied in the following forms.

Figure 9:
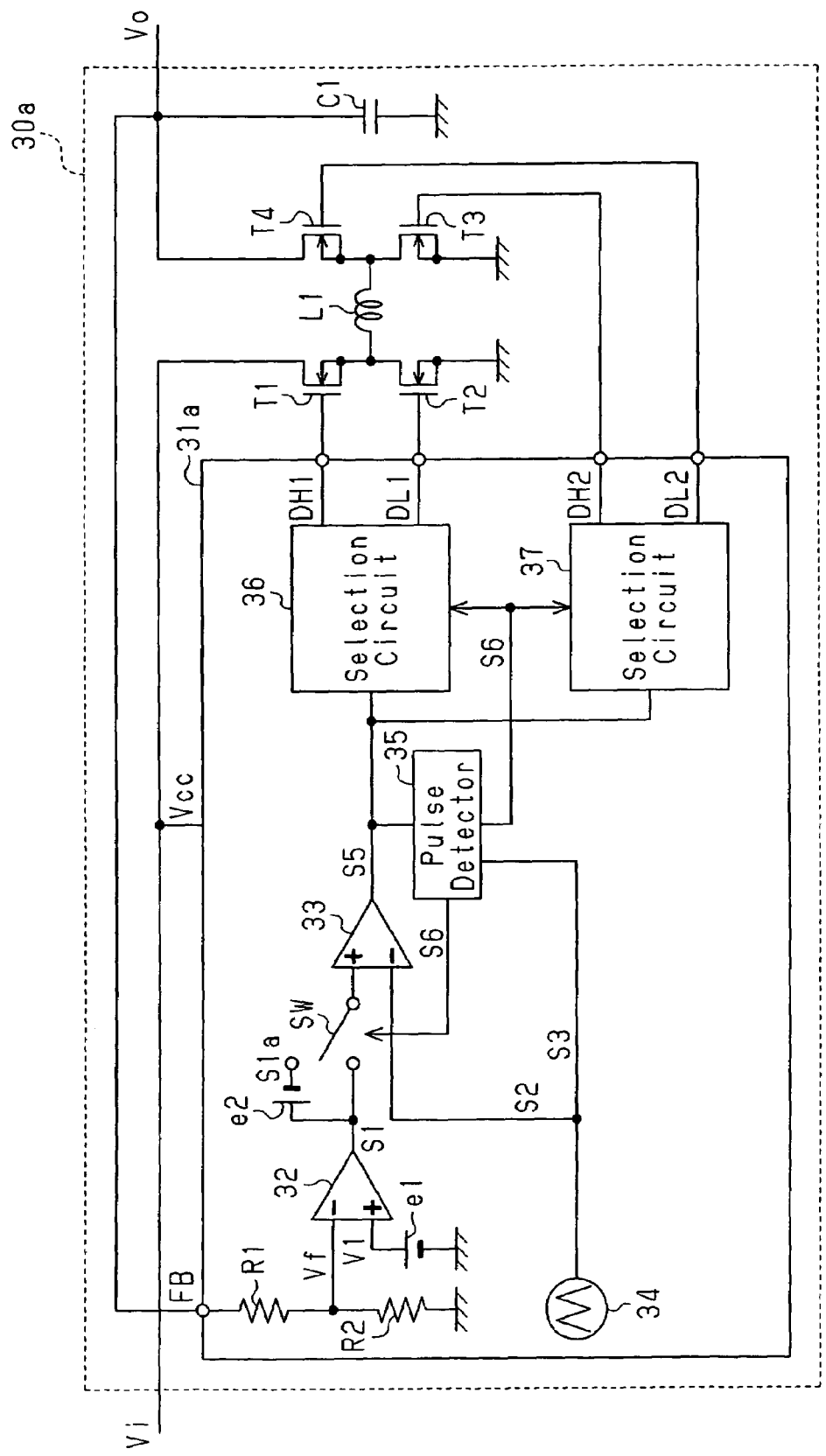
FIG. 9 is a schematic block circuit diagram of a step-up/step-down DC-DC converter according to another embodiment of the present invention.
Figure 10:
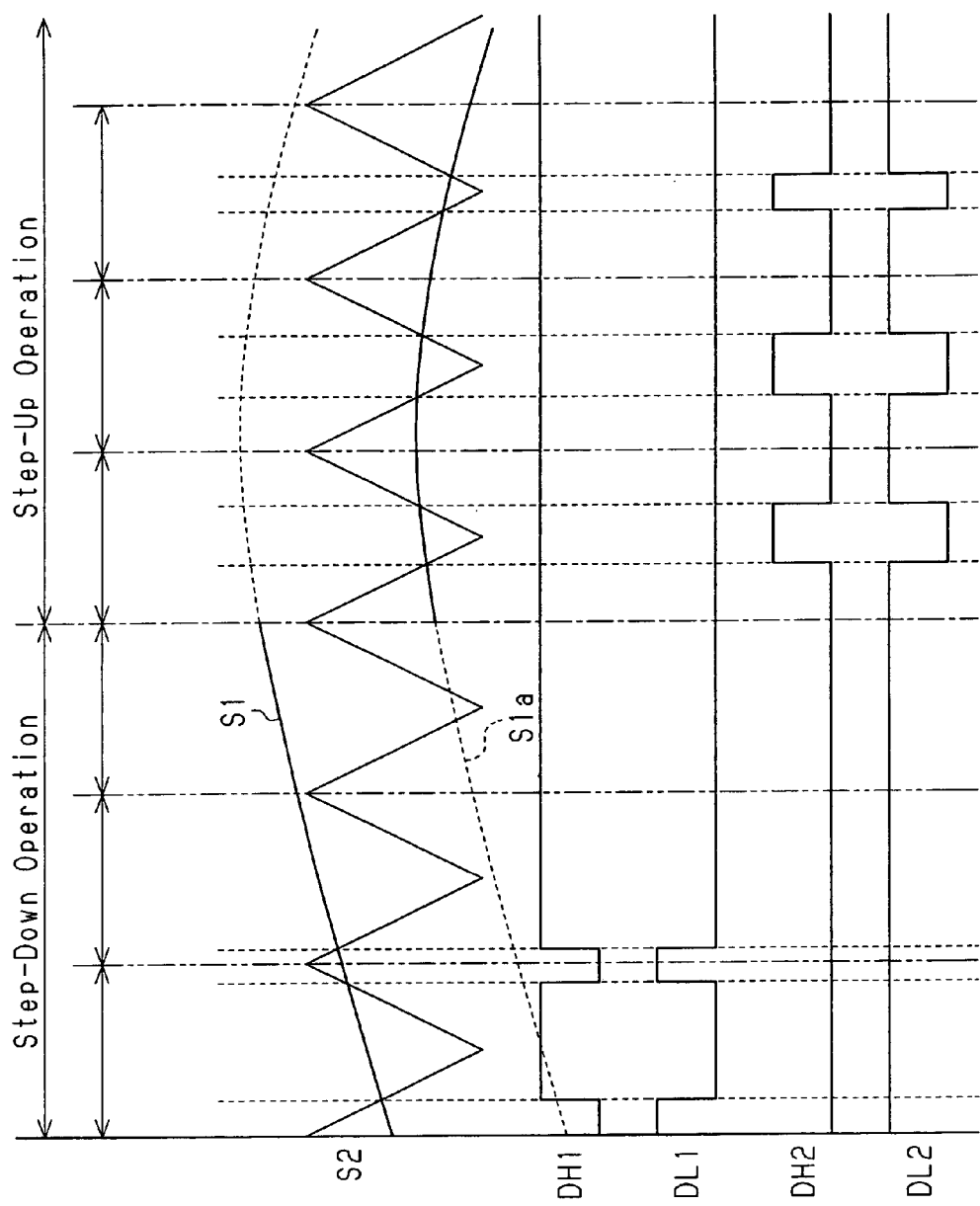
FIG. 10 is a waveform diagram showing the operation of the step-up/step-down DC-DC converter of FIG. 9.
Figure 11:
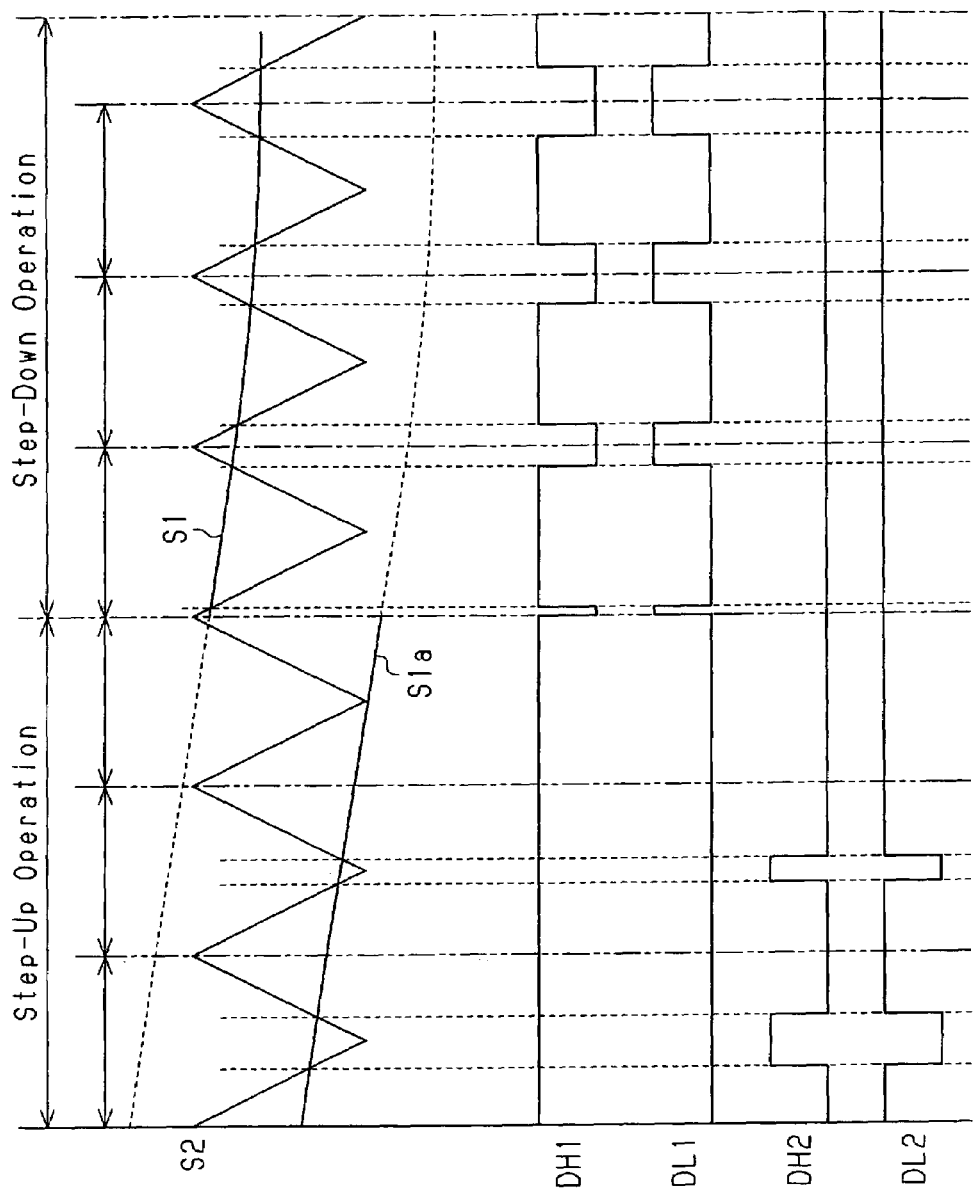
FIG. 11 is a waveform diagram showing the operation of the step-up/step-down DC-DC converter of FIG. 9.

The offset voltage V2 may be added to the error signal S1 as shown in FIG. 9, instead of being added to the triangular wave signal S2 of the oscillator 34. In this case, the PWM comparator 33 included in a control circuit 31a compares an error signal S1 or an offset error signal S1a, which is obtained by adding the offset voltage V2 to the error signal S1, with a triangular wave signal S2 in the manner shown in FIGS. 10 and 11. In a DC-DC converter 30a configured in this manner, two of output transistors T1 to T4 are operated in the same manner as in the preferred embodiment. This reduces the operation loss caused by the transistors and prevents the number of transistors operating at the same time from increasing. Further, the step-down operation and the step-down operation are performed with the single PWM comparator 33. This prevents the circuit scale of the DC-DC converter 30a from being enlarged.

The configuration of the switch SW and the voltage supply e2 for switching between the triangular wave signal S2 and the offset signal S4 or the configuration of the switch SW and the voltage supply e2 for switching between the error signal S1 and the offset error signal S1a may be changed as required. For example, a variable voltage supply for switching the output voltage to 0V or to voltage V2 in response to the mode switch signal S6 may be used.

A P-channel MOS transistor may be used as at least one of the transistors T1 to T4. In this case, the logic of the control signal provided to the gate of each transistor is changed in accordance with the type of transistor. In other words, the configurations of the selection circuits 36 and 37 are changed as required in accordance with the type of each transistor.

The present examples and embodiments are to be considered as illustrative and not restrictive, and the invention is not to be limited to the details given herein, but may be modified within the scope and equivalence of the appended claims.

What is claimed is:

1. A step-up/step-down DC-DC converter for generating an output voltage from an input voltage, the step-up/step-down DC-DC converter comprising:
   a choke coil;
   a pair of step-down transistors and a pair of step-up transistors connected to the choke coil; and
   a control circuit for controlling the pair of step-down transistors and the pair of step-up transistors based on the output voltage of the DC-DC converter, the control circuit including:
      an error amplifier for comparing the output voltage with a reference voltage and generating an error signal that is in accordance with voltage difference between the output voltage and the reference voltage;
      a pulse width modulation comparator, connected to the error amplifier, for comparing the error signal with a triangular wave signal and generating a control pulse signal having a pulse width that is in accordance with the voltage difference between the output voltage and the reference voltage;

a pulse detector, connected to the pulse width modulation comparator, for receiving the control pulse signal and generating a mode switch signal for switching an operation mode of the DC-DC converter in accordance with the state of the control pulse signal; and an offset voltage adding unit, connected to the pulse detector, for adding an offset voltage to the triangular wave signal or to the error signal in response to the mode switch signal.

2. The DC-DC converter according to claim 1, wherein the control circuit includes:

an oscillator for generating the triangular wave signal; and a selection circuit, connected to the pulse width modulation comparator and the pulse detector, for generating a control signal using the control pulse signal, selecting the pair of step-down transistors or the pair of step-up transistors in accordance with the mode switch signal, and providing the selected pair of transistors with the control signal.

3. The DC-DC converter according to claim 2, wherein the selection circuit includes:

a first selection circuit for receiving the mode switch signal and the control pulse signal, generating a first control signal for activating and inactivating the pair of step-down transistors using the control pulse signal during a step-down operation mode, and generating a second control signal for fixing the pair of step-down transistors in a constant state during a step-up operation mode; and a second selection circuit for receiving the mode switch signal and the control pulse signal, generating a third control signal for fixing the pair of step-up transistors in a constant state during the step-down operation mode, and generating a fourth control signal for activating and inactivating the pair of step-up transistors using the control pulse signal during the step-up operation mode.

4. The DC-DC converter according to claim 1, wherein the control circuit includes:

an oscillator for generating a monitor pulse signal having pulses in predetermined cycles, the pulse detector determining whether the operation mode needs to be switched in each pulse switching cycle of the monitor pulse signal.

5. The DC-DC converter according to claim 1, wherein the pulse detector determines that the operation mode needs to be switched when duty of the control pulse signal is 100 percent.

6. The DC-DC converter according to claim 1, wherein the pulse width modulation comparator includes:

a current mirror unit having a pair of transistors;

an operation amplifier provided with a first differential input unit having a pair of transistors connected to the current mirror unit and respectively responsive to the error signal and the triangular wave signal; and an offset adjustment circuit provided with a second differential input unit having a pair of transistors connected to the current mirror unit, with one of the transistors receiving the offset voltage.

7. The DC-DC converter according to claim 1, wherein the offset voltage adding unit includes:

a voltage supply for adding the offset voltage to the triangular wave signal or the error signal; and a switch for selectively providing the pulse width modulation comparator, in response to the mode switch signal, with the error signal and the offset voltage added error signal or with the triangular wave signal and the offset voltage added triangular wave signal.

8. A control circuit for a step-up/step-down DC-DC converter including a choke coil, a pair of step-down transistors connected to the choke coil, and a pair of step-up transistors connected to the choke coil, wherein the control circuit controls the pair of step-down transistors and the pair of step-up transistors based on an output voltage of the DC-DC converter, the control circuit comprising:

an error amplifier for comparing the output voltage with a reference voltage and generating an error signal that is in accordance with voltage difference between the output voltage and the reference voltage;

a pulse width modulation comparator, connected to the error amplifier, for comparing the error signal with a triangular wave signal and generating a control pulse signal having a pulse width that is in accordance with the voltage difference between the output voltage and the reference voltage;

a pulse detector, connected to the pulse width modulation comparator, for receiving the control pulse signal and generating a mode switch signal for switching an operation mode of the DC-DC converter in accordance with the state of the control pulse signal; and an offset voltage adding unit, connected to the pulse detector, for adding an offset voltage to the triangular wave signal or the error signal in response to the mode switch signal.

9. The control circuit according to claim 8, further comprising:

an oscillator for generating the triangular wave signal; and a selection circuit, connected to the pulse width modulation comparator and the pulse detector, for generating a control signal using the control pulse signal, selecting the pair of step-down transistors or the pair of step-up transistors in accordance with the mode switch signal, and providing the selected pair of transistors with the control signal.

10. The control circuit according to claim 9, further comprising:

a first selection circuit for receiving the mode switch signal and the control pulse signal, generating a first control signal for activating and inactivating the pair of step-down transistors using the control pulse signal during a step-down operation mode, and generating a second control signal for fixing the pair of step-down transistors in a constant state during a step-up operation mode; and a second selection circuit for receiving the mode switch signal and the control pulse signal, generating a third control signal for fixing the pair of step-up transistors in a constant state during the step-down operation mode, and generating a fourth control signal for activating and inactivating the pair of step-up transistors using the control pulse signal during the step-up operation mode.

11. The control circuit according to claim 8, further comprising:

an oscillator for generating a monitor pulse signal having pulses in predetermined cycles, the pulse detector determining whether the operation mode needs to be switched in each pulse switching cycle of the monitor pulse signal.

12. The control circuit according to claim 8, wherein the pulse detector determines that the operation mode needs to be switched when duty of the control pulse signal is 100 percent.

13. The control circuit according to claim 8, wherein the pulse width modulation comparator includes:
a current mirror unit having a pair of transistors;
an operation amplifier provided with a first differential input unit having a pair of transistors connected to the current mirror unit and respectively responsive to the error signal and the triangular wave signal; and
an offset adjustment circuit provided with a second differential input unit having a pair of transistors connected to the current mirror unit, with one of the transistors receiving the offset voltage.

14. The control circuit according to claim 8, wherein the offset voltage adding unit includes:
a voltage supply for adding the offset voltage to the triangular wave signal or the error signal; and
a switch for selectively providing the pulse width modulation comparator, in response to the mode switch signal, with the error signal and the offset voltage added error signal or with the triangular wave signal and the offset voltage added triangular wave signal.

15. A method for controlling a step-up/step-down DC-DC converter including a choke coil, a pair of step-down transistors connected to the choke coil, and a pair of step-up transistors connected to the choke coil, the method comprising:
comparing an output voltage of the DC/DC converter with a reference voltage and generating an error signal that is in accordance with voltage difference between the output voltage and the reference voltage;
comparing the error signal with a triangular wave signal and generating a control pulse signal having a pulse width that is in accordance with the voltage difference between the output voltage and the reference voltage;
controlling the pair of step-down transistors and the pair of step-up transistors based on the control pulse signal;
generating a mode switch signal for switching an operation mode of the DC-DC converter in accordance with the state of the control pulse signal; and
adding an offset voltage to the triangular wave signal or the error signal in accordance with the mode switch signal.

16. The method according to claim 15, wherein said controlling the pair of step-down transistors and the pair of step-up transistors includes:
generating a control signal using the control pulse signal;
selecting the pair of step-down transistors or the pair of step-up transistors in accordance with the mode switch signal; and
providing the selected pair of transistors with the control signal.

17. The method according to claim 15, wherein said controlling the pair of step-down transistors and the pair of step-up transistors includes:
generating, in a step-down operation mode, a first control signal for activating and inactivating the pair of step-down transistors using the control pulse signal, and a second control signal for fixing the pair of step-up transistors in a constant state; and
generating, in a step-up operation mode, a third control signal for fixing the pair of step-down transistors using the control pulse signal in a constant state, and a fourth control signal for activating and inactivating the pair of step-up transistors.

18. The method according to claim 15, further comprising:
generating a monitor pulse signal having pulses in predetermined cycles; and
determining whether the operation mode needs to be switched in each pulse switching cycle of the monitor pulse signal.

19. The method according to claim 15, wherein said generating a mode switch signal includes:
generating the mode switch signal when duty of the control pulse signal is 100 percent.

20. The method according to claim 15, wherein said adding an offset voltage to the triangular wave signal or the error signal includes:
adding the offset voltage to the triangular wave signal or the error signal in accordance with a mode switch signal indicating a step-down operation mode.

* * * * *